(12) United States Patent
Hoellinger et al.

(10) Patent No.: US 9,520,774 B2
(45) Date of Patent: Dec. 13, 2016

(54) POWER SWITCH RELIABILITY IN SWITCHED CAPACITOR DC-DC CONVERTER

(75) Inventors: Werner Hoellinger, Klagenfurt (AT); Stefano Marsili, Faak am See (AT); Benno Ankele, Villach (AT)

(73) Assignee: Infineon Technologies AG, Neubiberg (DE)

( * ) Notice: Subject to any disclaimer, the term of this patent is extended or adjusted under 35 U.S.C. 154(b) by 1095 days.

(21) Appl. No.: 13/230,772

(22) Filed: Sep. 12, 2011

(65) Prior Publication Data

US 2013/0063120 A1 Mar. 14, 2013

(51) Int. Cl.
*H02M 3/07* (2006.01)
*H02M 3/06* (2006.01)

(52) U.S. Cl.
CPC ............... *H02M 3/07* (2013.01); *H02M 3/06* (2013.01)

(58) Field of Classification Search
CPC ................................. H02M 3/06; H02M 3/07
USPC ....... 363/59, 60, 62; 327/536, 537; 307/110; 320/166
See application file for complete search history.

(56) References Cited

U.S. PATENT DOCUMENTS

| | | | |
|---|---|---|---|
| 6,617,908 B1 * | 9/2003 | Thomsen ................ H03F 3/005 327/337 |
| 6,657,875 B1 * | 12/2003 | Zeng et al. ..................... 363/59 |
| 6,856,525 B2 * | 2/2005 | Wallis ............................. 363/59 |
| 6,920,055 B1 | 7/2005 | Zeng et al. |
| 7,230,470 B1 | 6/2007 | You et al. |
| 7,250,810 B1 * | 7/2007 | Tsen ........................ H02M 3/07 315/291 |
| 7,893,752 B2 * | 2/2011 | Tanaka .......................... 327/537 |
| 8,248,152 B2 * | 8/2012 | Dennard et al. ............... 327/536 |
| 8,319,545 B2 * | 11/2012 | Sousa ...................... H02M 3/07 327/536 |
| 8,742,834 B2 * | 6/2014 | Motoki .................... H02M 3/07 327/536 |
| 2002/0093318 A1 | 7/2002 | Wallis |
| 2005/0030770 A1 | 2/2005 | Sutardja et al. |
| 2006/0092583 A1 * | 5/2006 | Alahmad ............... H02J 7/0024 361/15 |
| 2007/0176494 A1 * | 8/2007 | Medi ....................... H02M 3/06 307/109 |
| 2008/0157855 A1 * | 7/2008 | Delano ................... H02M 3/07 327/536 |
| 2009/0002064 A1 | 1/2009 | Tanaka |
| 2010/0117612 A1 * | 5/2010 | Klootwijk ............... H02M 3/07 323/282 |
| 2010/0214014 A1 * | 8/2010 | Dennard .................. H02M 3/07 327/541 |
| 2010/0225291 A1 * | 9/2010 | Kajino .................... H02M 3/07 323/283 |
| 2011/0140812 A1 * | 6/2011 | Wu et al. ..................... 333/81 R |
| 2013/0106382 A1 * | 5/2013 | Marsili ................... H02M 3/07 323/283 |

FOREIGN PATENT DOCUMENTS

WO 2010/097274 A1 9/2010

* cited by examiner

*Primary Examiner* — Jue Zhang
*Assistant Examiner* — Lakaisha Jackson
(74) *Attorney, Agent, or Firm* — Shumaker & Sieffert, P.A.

(57) ABSTRACT

Representative implementations of devices and techniques minimize hot carrier stress in a switched capacitor dc-dc converter. Multi-switch arrangements may be used in conjunction with a timing scheme to stage power switch operation.

20 Claims, 4 Drawing Sheets

POWER SWITCH RELIABILITY IN SWITCHED CAPACITOR DC-DC CONVERTER

BACKGROUND

Various mobile or portable electronic devices may have reduced power consumption by operating some of the systems within these devices at low voltages (e.g., 3.0 volts, 1.5 volts, etc.). Such electronic devices often use direct current to direct current converters ("dc to dc converters" or "dc-dc converters") to "step down" voltages available from their power supplies to the lower voltages used by these systems.

Typical dc-dc converters include switched capacitor dc-dc converters, which may contain one or more switches controlling one or more energy storage elements (e.g., "flying capacitors," etc.). The switches determine when the energy storage elements charge and discharge to supply power to the load. The energy storage elements may charge from a regulated current source and may discharge at least in part to a "buffer" or output capacitor coupled in parallel with the load.

The switches used in switched capacitor dc-dc converters, particularly those implemented in sub-micrometer technologies, can suffer from a condition referred to as hot carrier stress (HCS), which may degrade the performance of the switch over time. High-energy carriers, also called hot carriers, can be generated in a switch as a result of high energy electric fields generated around the devices during operation. The presence of such hot carriers triggers numerous physical damage processes, referred to as HCS, which can change the switch characteristics over the life-time of the device. Long-term operation can cause malfunction of circuits using switches, such as dc-dc converters.

For example, high energy electric fields may accelerate local carriers in switch materials (e.g., semiconductor materials) to effective temperatures well above the lattice temperature. The hot carriers can transfer kinetic energy to the lattice that may break bonds at the Si/SiO2 interface. Also, as a result of the high energy electric fields, carriers can be injected into the SiO2 layer, and can become trapped there.

Incidents such as bonds broken or carriers becoming trapped may create an undesired charge in the SiO2 layer and/or cause an interface trap that can reduce channel carrier mobility and increase the threshold voltage of the device. Related problems caused by HCS in various devices can include substrate current due to hot carrier flow into the bulk, device degradation from hot carrier flow into the gate, decreased drain current, decreased transconductance, and degradation of the sub-threshold slope.

Some solutions have been offered to reduce the effects of HCS. Many, if not all of the solutions offered reduce hot carrier degradation at the cost of an increase in the on-resistance/impedance ($R_{ON}$) of the switch or an increase in the area of the switch (to achieve a same $R_{ON}$ value). The $R_{ON}$ of a switch and the area of the switch are both important performance parameters in a switched capacitor dc-dc converter, particularly when implemented in sub-micrometer technologies. Generally, the lower the $R_{ON}$, the better the performance, and the smaller the area, the better the device meets implementation or design standards.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 1A is a schematic of an example switched capacitor dc-dc converter in which the techniques in accordance with the present disclosure may be implemented. FIG. 1A shows the example dc-dc converter in a first operational phase.

DETAILED DESCRIPTION

Overview

Representative implementations of techniques and/or devices provide control of switch timing and/or provide switch arrangements of power switches used in switched capacitor dc-dc converters. In various implementations, timing schemes may be used in conjunction with various switch arrangements to reduce or eliminate the effects of high energy fields on switches; including metal-oxide-semiconductor (MOS) based switches and others. The techniques and/or devices may be used to reduce, minimize, or eliminate the effects of hot carrier stress (HCS) on the switch devices.

An example worst-case HCS condition is one where a low impedance power switch is employed to switch a high current and a high voltage at the same time. This combination generally creates the high energy electric fields described above, and may result in physical damage to the switch over time. Multi-switch arrangements may be used in conjunction with a timing scheme to stage power switch operation, and to avoid hot switching a low impedance power switch.

A typical switched capacitor dc-dc converter contains one or more switches controlling the charging and discharging of one or more energy storage elements (e.g., capacitors). The switches may couple the energy storage element(s) to a voltage source for charging and/or a load for discharging. In one example, one or more of the switches may be implemented using a pair or a group of switches. For example, a set of switches comprising two or more switches, with selected operating characteristics, may be used in place of a single power switch in the dc-dc converter. The timing of the switches in the set may be coordinated using a timing scheme, such that the switches in the set may not toggle concurrently during a charge phase, for example.

In alternate implementations, the one or more switches in a set of switches may be arranged to switch in an order based on the relative impedance of each of the switches. For example, a higher impedance switch in the set may be arranged to switch prior to a lower impedance switch. In other implementations, other characteristics of the individual switches may be used to coordinate timing of the switches in a set.

Various implementations of switch timing control and switch arrangements for a switched capacitor dc-dc converter are discussed in this disclosure. Techniques and devices of switching control are discussed with reference to example dc-dc converter circuit schematics and various related waveforms illustrated in the figures. The techniques and devices discussed may be applied to any of various dc-dc converter designs, circuits, and devices and remain within the scope of the disclosure. Further, the techniques and devices discussed herein are referred to in the environment of a dc-dc converter circuit for ease of discussion and illustrative convenience. The techniques and/or devices may also be used in other implementations, circuits, systems, and the like, to reduce or eliminate hot carrier stress.

Advantages of the disclosed techniques and devices are varied, and include: 1) reduced physical damage to switch devices (e.g., power switches), including broken bonds and other device degradation; 2) increased reliability of switches and systems; 3) improved performance using low impedance switches; 4) reduced size of switch devices; 5) reduced interface trap occurrences and substrate currents affecting carrier mobility and threshold voltage; and 6) reliable drain current, transconductance, and sub-threshold slope. Other advantages of the disclosed techniques may also be present.

Implementations are explained in more detail below using a plurality of examples. Although various implementations and examples are discussed here and below, further implementations and examples may be possible by combining the features and elements of individual implementations and examples.

Example Switched Capacitor DC-DC Converter

Figure 1A:
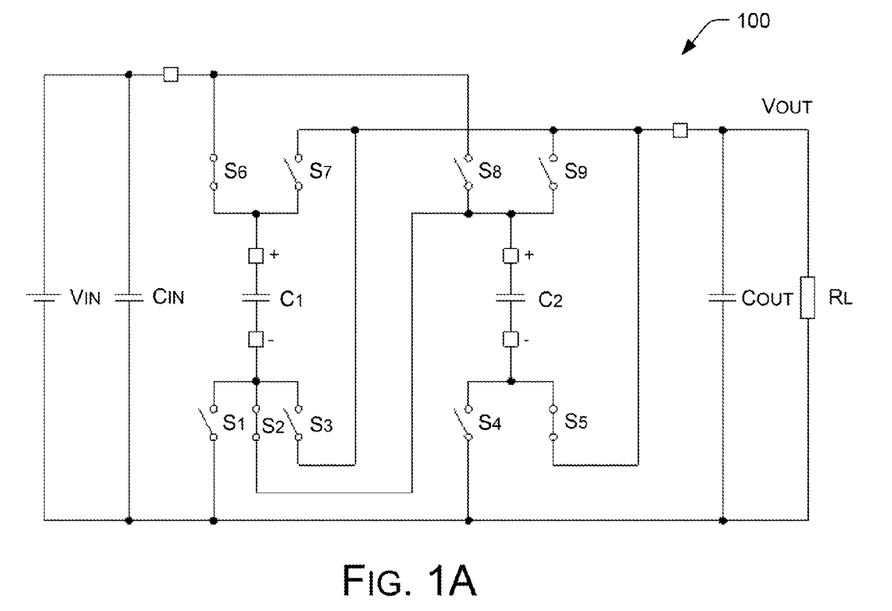

FIG. 1A is a schematic drawing showing an illustrative dc-dc converter circuit 100, wherein techniques and/or devices to provide switching control (e.g., programmable switching, switch timing, etc.) may be employed. It is to be understood that the techniques and/or devices may be implemented as part of the dc-dc converter circuit 100, or as part of another system (for example as a peripheral to a dc-dc converter 100, etc.). The illustrated dc-dc converter in FIG. 1A is shown and described in terms of a "buck" device, which reduces the input DC voltage ($V_{IN}$) to a desired lower output DC voltage ($V_{OUT}$). This illustration is, however, for ease of discussion. The techniques and devices described herein with respect to for dc-dc converters is not limited to a buck device, and may be applied to other types of dc-dc converters (e.g., boost, buck-boost, etc.) without departing from the scope of the disclosure. While the disclosure discusses switched capacitor type dc-dc converters, various other types of dc-dc converters may employ techniques and/or devices discussed herein. Accordingly, the generic term "dc-dc converter" is used throughout.

As shown in FIG. 1A, an example dc-dc converter 100 may be designed with a one or more switches (such as switches S1, S2, S3, . . . S9) and energy storage elements (such as energy storage elements C1 and C2). In an implementation, one or more of the switches S1-S9 may control the charging and/or discharging of energy storage element C1 and/or C2. The one or more switches S1-S9 may do so by opening and closing according to a timing scheme to allow charging from a voltage source (such as $V_{IN}$), and discharging to a load (shown as load $R_L$). In various implementations, one or more of the switches S1-S9 may be arranged to receive a switching signal (e.g., a gate-source voltage ($V_{GS}$)), or the like, causing the switch to toggle.

In FIG. 1A, nine switches (S1, S2, S3, . . . S9) are illustrated for ease of discussion. In various implementations, more switches or fewer switches may also be used in a dc-dc converter 100. A timing component may also be included (shown in FIG. 3 as timing component 302) to determine a switching timing for one or more of the switches S1-S9. In various implementations, the timing component may be integrated with the dc-dc converter or may be peripheral to the dc-dc converter, and provide one or more switching signals (shown in FIG. 3 as switching signals 304) to the switches. In further implementations, one or more switching signals 304 may be provided to the switches from a remote source.

In one implementation, two or more of the switches S1-S9 may be arranged to have an offset or staggered switching, such that the switches do not toggle at the same time, but according to a preset difference. In a further implementation, the two or more switches S1-S9 may be arranged to switch in an order based on the relative impedance of the switches. For example, one or more of the switches S1-S9 that have a lower impedance may be arranged to switch at a time that is a preset duration after others of the switches S1-S9 that have a higher impedance have switched.

The load $R_L$ may represent a device, a system, or the like, that is supplied with power by the dc-dc converter 100, and consumes a current load. For example, the load $R_L$ may represent a sub-system of a communications device, a microcontroller, or the like. In some implementations, as shown in FIG. 1A, an example dc-dc converter 100 may include an input capacitance $C_{IN}$ and/or a load capacitance $C_{OUT}$ (i.e., buffer capacitor) in parallel with the load $R_L$. If it is included, the energy storage elements C1 and/or C2 may also discharge energy to the load capacitance $C_{OUT}$, making additional energy available to the load $R_L$, and buffering load variations. The output of the dc-dc converter 100 ($V_{OUT}$) is shown in the example of FIG. 1A as the voltage across the load $R_L$.

In various implementations, switches S1-S9 may be implemented with metal-oxide semiconductor (MOS) devices, such as P-type Metal Oxide Semiconductor (PMOS) and/or N-type Metal Oxide Semiconductor (NMOS) devices or transistors, controlled via a clock signal, for example. In other implementations, switches S1-S9 may be implemented using diodes, other types of transistors, or the like. Energy storage devices C1 and C2 may be implemented with a capacitor, or a like energy storage device.

The number of energy storage elements C1 and C2 used in an example dc-dc converter 100 may be chosen based on the ratio of input voltage ($V_{IN}$) to output voltage ($V_{OUT}$), to maximize the energy transfer from the input source to the output load. In example implementations, to achieve a ratio of 2:1 ($V_{IN} \geq 2 \times V_{OUT}$), one energy storage element (C1 or C2) may be sufficient, and for a ratio of 3:1 ($V_{IN} \geq 3 \times V_{OUT}$), two energy storage elements (C1 and C2) may be used, and so on. Accordingly, additional energy storage elements may use additional switches.

Figure 1B:
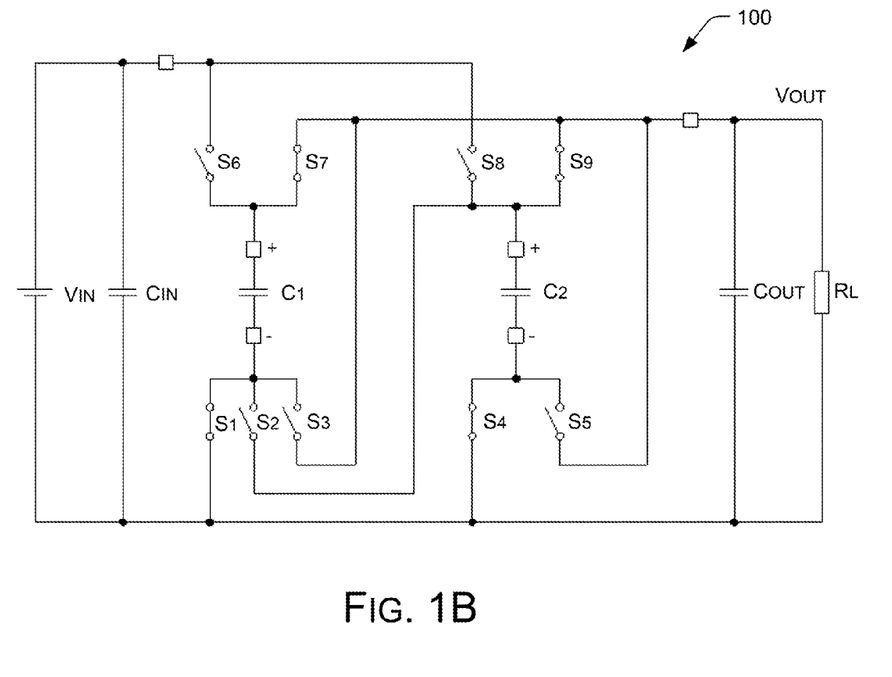
FIG. 1B is a schematic of the example switched capacitor dc-dc converter of FIG. 1A, in a second operational phase.

Example operation of a dc-dc converter 100 may be illustrated using the circuit diagrams of FIGS. 1A and 1B, showing an implementation having a 3:1 ratio. The described operation is not limited to the circuits shown, and may also apply to various other circuit configurations of dc-dc converters. FIG. 1A is a schematic of the example dc-dc converter 100 in a first phase of operation. Energy storage element C1 is shown coupled in series to the input voltage $V_{IN}$, energy storage element C2, and buffer capacitor $C_{OUT}$. In this configuration, as illustrated, energy storage elements C1 and C2 are in a charge phase, each charging to approximately ⅓ $V_{IN}$.

In the example shown in FIG. 1A, switch S6 couples energy storage element C1, at a first terminal (e.g., the positive terminal) of C1, to the positive terminal of the input source $V_{IN}$. Switch S2 couples C1, at a second terminal of C1 (e.g., the negative terminal), to a first terminal (e.g., the positive terminal) of energy storage device C2 via the switch S2. Switch S5 couples energy storage element C2, at a second terminal of C2, to the positive terminal of the buffer capacitor $C_{OUT}$ (and $R_L$). The negative terminal of the buffer capacitor $C_{OUT}$ (and $R_L$) is in common to the negative terminal of the input source $V_{IN}$.

FIG. 1B is schematic of the dc-dc converter 100, in a second phase of operation. Energy storage element C1 is shown coupled in parallel with energy storage element C2, and buffer capacitor $C_{OUT}$. In this configuration, as illustrated, energy storage elements C1 and C2 are in a discharge phase, discharging energy to $C_{OUT}$ and $R_L$.

In the example shown in FIG. 1B, switch S7 couples energy storage element C1, at the first terminal (e.g., the positive terminal) of C1, to the first terminal (e.g., the positive terminal) of energy storage element C2, via switch S9. Switch S1 couples C1, at the second terminal of C1 (e.g., the negative terminal), to the second terminal (e.g., the negative terminal) of energy storage device C2 via the switch S4. The negative terminals of C1 and C2 are in common to the negative terminal of the buffer capacitor $C_{OUT}$ (and $R_L$), which is in common to the negative terminal of the input source $V_{IN}$.

In an implementation, one or more of the switches S1-S9 may be arranged to rest in a fixed state while one or more others of the switches toggle states during one or more phases and/or a preset number of switching cycles.

An energy transfer may be obtained by alternating the two different phases of operation, and their associated switch configurations as described above with reference to FIGS. 1A and 1B. In the first phase S6, S2, and S5 are closed and the other switches are open. The energy storage elements C1 and C2 are in series to the buffer capacitor $C_{OUT}$. Energy flows from the source $V_{IN}$ to the output and charges C1 and C2. During the second phase, S7, S9, S1, and S4 are closed and the other switches are open. The energy storage elements C1 and C2 are now in parallel to each other and to the buffer capacitor COUT. The energy stored in energy storage elements C1 and C2 during the first phase is transferred to the buffer capacitor COUT and to the load RL during the second phase.

In one implementation, during steady state, the energy storage elements C1 and C2, and the buffer capacitor $C_{OUT}$ will have a voltage which is substantially equal to $V_{OUT}$. Therefore, during the first phase when the energy storage elements C1 and C2 and the buffer capacitor $C_{OUT}$ are connected in series, an energy transfer from the source $V_{IN}$ occurs when $V_{IN} \geq 3 \times V_{OUT}$. In an implementation, the closer $V_{IN}$ is to $3 \times V_{OUT}$, the more efficient the energy transfer will be.

For the purposes of this discussion, it is assumed that there is an ideal transition between the two phases of operation described above. However, the techniques described are not limited to this case. In some implementations, additional phases might be used between the two phases in order to avoid short circuit situations. The inclusion of additional phases remains within the scope of the disclosure.

Additionally, other modes of operation are also within the scope of the disclosure, including modes using other voltage ratios (including 2:1 ratios, 1:1 ratios, or step-up ratios), modes including fewer or additional energy storage elements and/or switches, and modes including other components having similar operation. Further, dc-dc converters having additional components to the schematics are also within the scope of the disclosure.

Example Switch Timing Control and Switch Arrangements

As discussed above, a worst-case HCS condition may result when a low impedance power switch is employed to switch a high current and a high voltage at the same time. This may be the situation at the start of a charging cycle, when a low impedance MOS device is used, for example, at one or more of switches S5, and S6.

Figure 2:
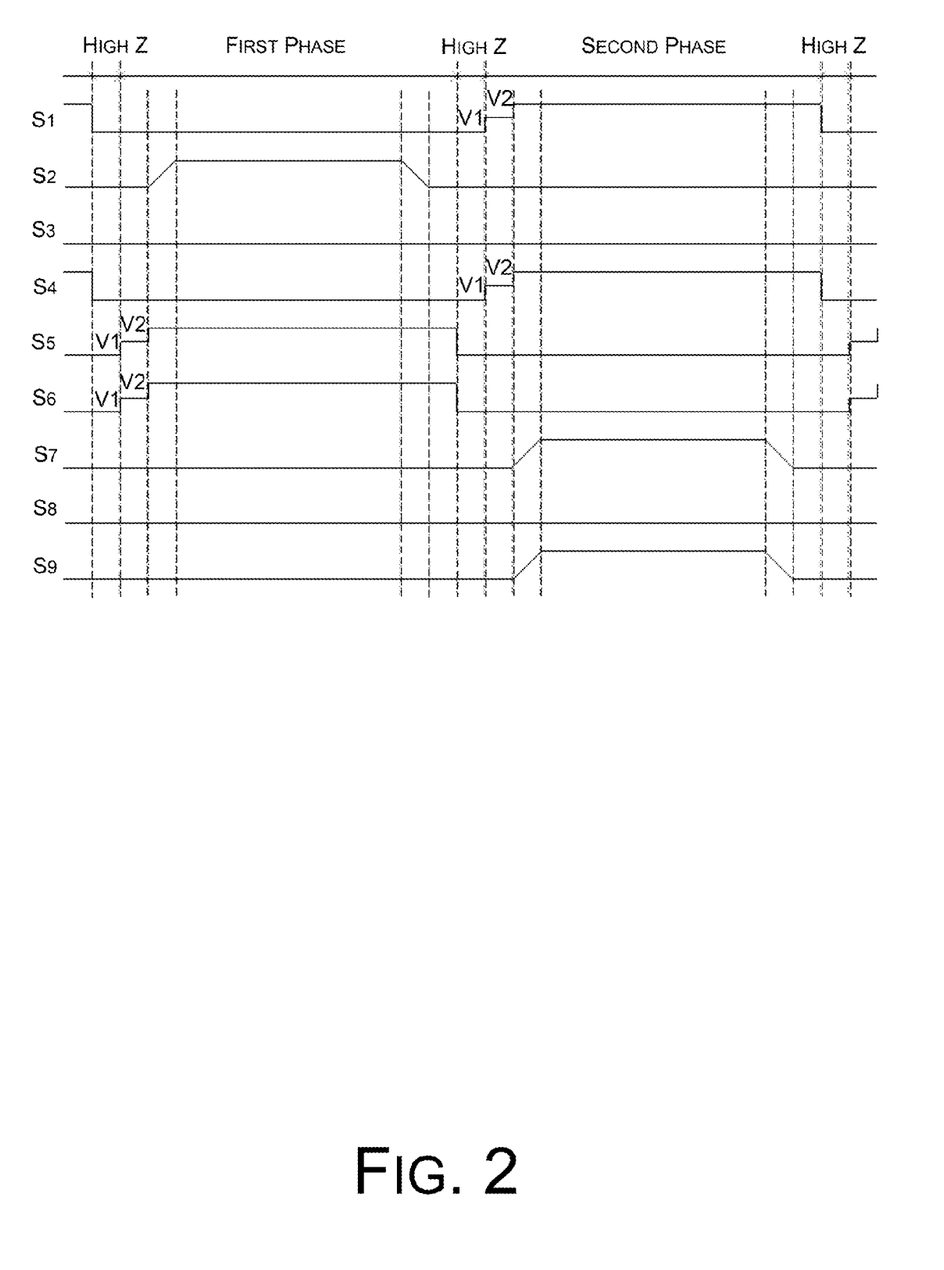
FIG. 2 is a waveform diagram showing example voltage waveforms controlling various switches, relative to the first and second operational phases shown in FIGS. 1A and 1B.

The waveforms of FIG. 2 show example voltage waveforms controlling various switches, relative to the first and second operational phases discussed with respect to FIGS. 1A and 1B, and according to an example implementation of switch timing control and/or switch arrangements. In one implementation, as shown, the first phase (charge phase) and the second phase (discharge phase) are separated by a short time interval where all switches are off (e.g., open). This is indicated in FIG. 2 by the durations marked "high Z." It is to be understood that the waveforms are substantially continuous, returning to the beginning of the waveforms after each ending. For convenience in viewing, the waveforms are shown with the ending portion being at least partially redundant with the beginning portion.

In an example, switches S1, S4, S5, and S6 are switching voltages, while switches S2, S7, and S9 are switching currents. In one implementation, switches S3 and S8 may be fixed in an "off" position. In some implementations, switches S3 and S8 may be used to realize different transformation ratios (e.g., 2:1 ratio, etc.), and the like.

As illustrated in the waveforms of FIG. 2, at the beginning of the first phase, switches S5 and S6 are off (i.e., open, maximum $R_{ON}$, or high Z state), while the voltage across at least these switches is at a maximum value. If switches S5 and S6 are implemented using very low $R_{ON}$ devices, then switches S5 and S6 will be subject to high current and high voltage at the same time upon closing, at the start of the first phase (charging phase). Accordingly, switches S5 and S6 will be subject to a worst-case HCS condition when they toggle closed.

Figure 3:
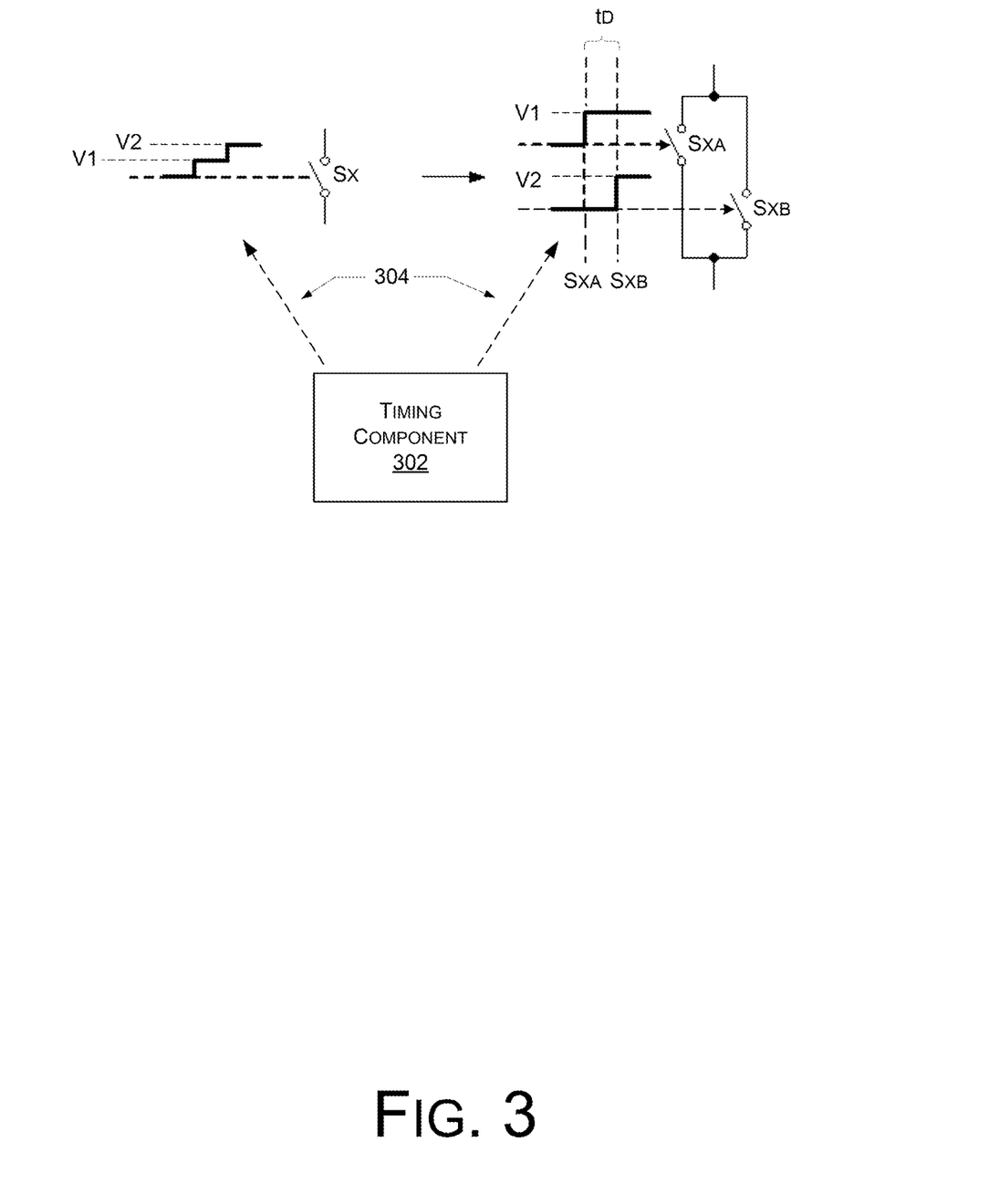
FIG. 3 is a schematic drawing of an example switch of the dc-dc converter of FIGS. 1A and 1B, implemented as a set of switches. Also shown is an example timing diagram showing an offset switching scheme for the set of switches.

In an implementation, one or more of the switches S1-S9 (such as switches S5 and/or S6, for example) may be implemented as a set (e.g., pair or group) of switches. The switches may be coupled in any number of configurations to accomplish the desired results. The switches in the set may be selected for their operational characteristics. For example, a high impedance switch that is insensitive to HCS may be coupled in parallel with a switch that may be more sensitive to HCS, but has a low impedance. A timing component (such as timing component 302) may be used to determine a switching timing for the pair of switches, such that one switch toggles with an offset relative to the other switch. Thus, hot switching may be avoided by switching the high impedance switch first, and then switching the low impedance switch after a preset delay, for example.

FIG. 3 is a schematic drawing of an example switch $S_X$ of a dc-dc converter 100 (such as a switch S5, S6, etc.) implemented as a set of parallel switches $S_{XA}$ and $S_{XB}$. In an implementation, switch $S_{XA}$ has a greater impedance than switch $S_{XB}$. For example, switch $S_{XA}$ may have an impedance that is at least a decade order of magnitude (10×) greater than the impedance of switch $S_{XB}$. In some implementations, the difference in impedance may be several orders of magnitude.

As shown in the timing diagrams of FIG. 3, switch $S_{XA}$ may be arranged to switch by a timing component 302 (e.g., a clocking scheme, digital controller, digital logic, etc.) prior to switch $S_{XB}$. The timing component 302, or another source, may provide switching signals 304 to one or more of the switches to cause the switches to toggle. In a further example, a switching signal 304 may be arranged to toggle (e.g., close) switch $S_{XB}$ a preset duration (e.g., delay) $t_D$ after switch $S_{XA}$ has toggled (e.g., closed), where the duration $t_D$ commences at the switching of switch $S_{XA}$.

In one implementation, a timing component 302 is arranged to toggle the first switch $S_{XA}$ when a voltage across $S_{XA}$ is approximately a maximum voltage. For example, $S_{XA}$ may be toggled at the locations indicated as "high Z" in FIG. 2, and where the voltage across the switch $S_{XA}$ is at a maximum (e.g., at the beginning of the first phase for switches S5 and S6). In another implementation, the timing component 302 may be arranged to toggle the second switch $S_{XB}$ when a voltage across the second switch $S_{XB}$ is approximately a minimum voltage. When switches $S_{XA}$ and $S_{XB}$ are arranged in parallel, the voltage across switch $S_{XB}$ may be at a minimum a preset duration $t_D$ after switch $S_{XA}$ has toggled (e.g., closed), for example.

In an implementation, the duration $t_D$ may represent a time for the energy storage elements C1 and/or C2 to charge to a particular voltage V1 after switch $S_{XA}$ closes. Then, when switch $S_{XB}$ closes, at the end of the delay $t_D$, storage elements C1 and/or C2 may further charge to another voltage V2, where V2 represents a maximum charge voltage for the energy storage elements C1 and C2. In one implementation, the timing component 302 is arranged to open the first and second switches ($S_{XA}$ and $S_{XB}$) concurrently during the discharge phase. In other implementations, the timing component 302 may be arranged to open the first and second switches in other configurations, including staged configurations.

Thus, in various implementations, a HCS resistive first switch $S_{XA}$ may create a significantly reduced stress condition for a low-impedance second switch $S_{XB}$. For example, switch $S_{XA}$ may be considered a "pre-charge" switch, switching the high voltage but at a lesser current. Since the HCS resistive switch $S_{XA}$ may not switch high currents, it can be selected to have a high impedance and be relatively small. On the other hand, the low-impedance switch $S_{XB}$ can be selected according to a smallest $R_{ON}$ value and a smallest area, since switch $S_{XB}$ switches only a small voltage at a higher current.

In terms of metal-oxide-semiconductor field effect transistor (MOSFET) switch implementations, the low impedance device (e.g., $S_{XB}$) may be subject either to a maximum $V_{DS}$ at zero $V_{GS}$ (when $S_{XB}$ is open or delayed) or to low $V_{DS}$ at high $V_{GS}$ (when $S_{XB}$ is closed and passing current), but not to high $V_{DS}$ at non-zero $V_{GS}$ (a hot carrier stress condition).

Both switches ($S_{XA}$ and $S_{XB}$) can be selected to be optimized for their respective roles, and can be controlled individually or as part of a comprehensive timing scheme. In alternate implementations, a set of switches may be comprised of any number of switches in various coupling configurations including combinations of series and parallel connections, and accomplish the results described herein.

Representative Process

Figure 4:
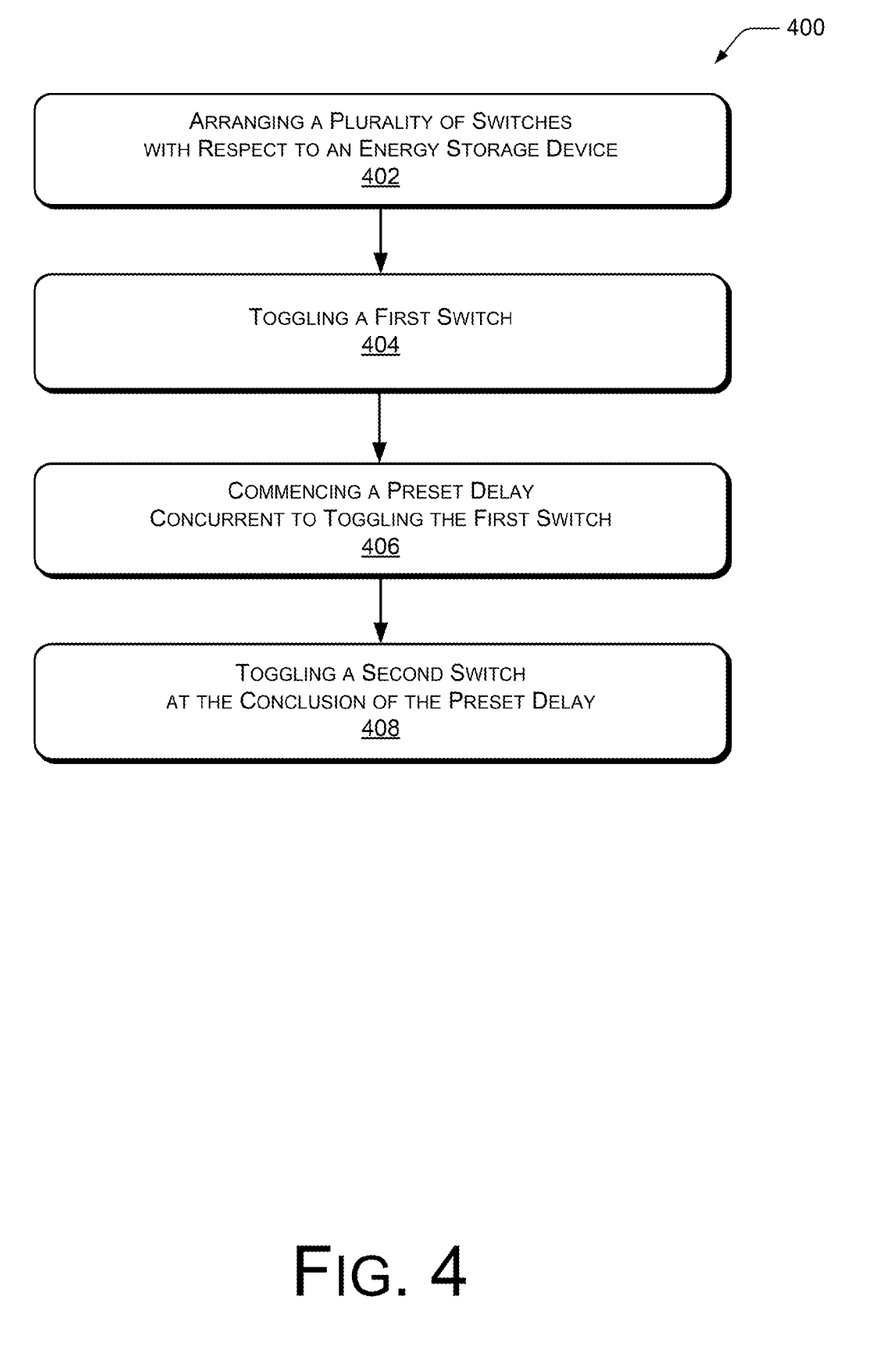
FIG. 4 is a flow diagram illustrating an example switch timing process using multiple switches in a dc-dc converter according to an implementation.

FIG. 4 illustrates a representative process 400 for implementing switch timing control for a dc-dc converter (such as the dc-dc converter 100). This may also include arranging switches in a manner to take advantage of a timing scheme. For example, a process 400 may include delaying the toggling of some switches a preset duration after other switches have toggled. The switch timing and switch arrangements may be used to reduce, minimize, or eliminate hot carrier stress conditions (HCS) as described above. The example process 400 is described with reference to FIGS. 1-3.

At block 402, the process includes arranging a plurality of switches (such as switches $S_{XA}$ and $S_{XB}$) with respect to an energy storage device (such as energy storage devices C1 and/or C2). In an example, the plurality of switches includes a set (pair or group) of switches implemented in place of one or more power switches (such as one or more of switches S1-S9) of a dc-dc converter. The switches in the set may be selected based on their operational characteristics (e.g., impedance of the switches). For example, at least two selected switches (such as a first switch $S_{XA}$ and a second switch $S_{XB}$) may be coupled in parallel to each other, and implemented in place of one or more power switches. In an implementation, the first switch and the second switch may, for example, be coupled to the same terminal of the energy storage device, and may couple the energy storage device to a voltage source (such as $V_{IN}$). In alternate implementations, additional switches may be coupled in parallel with the first and second switches, or may be coupled with the first and second switches in combinations of series and parallel connections, and remain within the scope of the disclosure.

In one implementation, at least one of the plurality of switches (for example, the first switch and the second switch) comprises a metal-oxide-semiconductor device, such as a MOSFET. In various implementations, any of varied techniques may be applied to provide switching signals and/or control for one or more of the switches (e.g., S1-S9, $S_{XA}$, and $S_{XB}$). For example, timing may be supplied by a timing component (such as timing component 302), a counter, a clock, digital logic, a digital controller, and the like. Any of these techniques may be applied individually or in combination, including in combination with other techniques.

At block 404, the process includes toggling the first switch. In an implementation, toggling the first switch includes closing the first switch, and charging the energy storage device to a first voltage (such as voltage V1) when the first switch is closed. In one example, the first switch is toggled while a voltage across the first switch (e.g., $V_{DS}$) is at a maximum voltage. This may be the case at the beginning of a charging cycle, for instance. In alternate implementations, the process includes toggling a multiplicity of switches that are arranged in a "first switch" type of configuration (e.g., high-impedance pre-charge configuration).

At block 406, the process includes commencing a preset delay (such as preset delay $t_D$) concurrent to toggling the first switch. In one implementation, the toggling of the first switch may signal the preset delay to begin. In an implementation, the preset delay represents a time for a voltage across the second switch to change from a maximum voltage to a minimum voltage.

At block 408, the process includes toggling the second switch at the conclusion of the preset delay. In an implementation, toggling the second switch includes closing the second switch, and charging the energy storage device to a second voltage (such as voltage V2) when the second switch is closed. In one example, the second switch is toggled while a voltage across the second switch (e.g., $V_{DS}$) is at a minimum voltage. This may be the case a particular duration after the first switch has closed, for instance, when the first and second switches are coupled in parallel. In alternate implementations, the process includes toggling a multiplicity of switches that are arranged in a "second switch" type of configuration (e.g., low-impedance high-current configuration).

In an implementation, the process includes opening the first and second switches concurrently, and discharging one or more energy storage devices. This may be the case at the end of a charging phase and/or the beginning of a discharging phase. In other implementations, the first and second switches may be opened in a staged arrangement, or according to another timing scheme, including a timing scheme that discharges the energy storage elements in a staged arrangement.

The order in which the process 400 is described is not intended to be construed as a limitation, and any number of the described process blocks can be combined in any order to implement the processes, or alternate processes. Additionally, individual blocks may be deleted from the processes without departing from the spirit and scope of the subject matter described herein. Furthermore, the processes can be implemented in any suitable hardware, software, firmware, or a combination thereof, without departing from the scope of the subject matter described herein.

In alternate implementations, other techniques may be included in the process 400 in various combinations, and remain within the scope of the disclosure.

Conclusion

Although the implementations of the disclosure have been described in language specific to structural features and/or methodological acts, it is to be understood that the implementations are not necessarily limited to the specific features or acts described. Rather, the specific features and acts are disclosed as representative forms of implementing the invention.

What is claimed is:

1. An apparatus, comprising:
   an energy storage element;
   a first switch coupled to a first terminal of the energy storage element; and
   a second switch coupled to the first terminal of the energy storage element, the second switch arranged to toggle offset from the first switch, and the second switch to toggle once a voltage across the second switch reaches approximately a minimum voltage and wherein the first and second switches are arranged to toggle in an order based on a relative impedance of the first and second switches.

2. The apparatus of claim 1, wherein the first switch is arranged to toggle when a voltage across the first switch is approximately a maximum voltage.

3. The apparatus of claim 1, wherein the first switch has a greater impedance than the second switch, and wherein the first switch is arranged to toggle prior to the second switch.

4. The apparatus of claim 1, wherein the first switch has an impedance that is at least a decade order of magnitude greater than the second switch, and wherein the second switch is arranged to toggle a preset duration after the first switch has toggled.

5. The apparatus of claim 1, wherein the second switch is arranged to close after a preset delay, the preset delay commencing at a closing of the first switch.

6. The apparatus of claim 1, wherein the first and second switches are arranged to open concurrently.

7. A direct current to direct current (dc-dc) converter, comprising:
   an energy storage element; and
   a plurality of switches coupled to a first terminal of the energy storage element, at least one of the plurality of switches arranged to receive a switching signal, the switching signal arranged to delay a switching of one or more of the plurality of switches by a preset time duration when another of the plurality of switches has toggled, and wherein the switching signal is arranged to switch the plurality of switches in an order based on a relative impedance of the plurality of switches.

8. The dc-dc converter of claim 7, wherein one or more of the plurality of switches has a lower impedance than others of the plurality of switches, and wherein the switching signal is arranged to switch the one or more of the plurality of switches a preset duration after switching the others of the plurality of switches.

9. The dc-dc converter of claim 7, wherein the one or more of the plurality of switches has an impedance that is at least a decade order of magnitude lower than the others of the plurality of switches, and wherein the switching signal is arranged to toggle the one or more of the plurality of switches a preset duration after at least one of the others of the plurality of switches have toggled.

10. The dc-dc converter of claim 7, wherein the switching signal is arranged to close one or more of the plurality of switches after a preset delay, the preset delay commencing at a closing of one or more others of the plurality of switches.

11. The dc-dc converter of claim 7, wherein at least two of the plurality of switches are arranged in parallel to each other.

12. A method comprising: toggling a first switch of a plurality of switches based on a relative impedance of the first switch and a second switch of the plurality of switches, wherein: the first switch has a higher impedance than the first switch, and one or more of the first switch and the second switch couple an energy storage device of a direct current to direct current (dc-dc) converter to a voltage source; commencing a preset time delay concurrent to toggling the first switch; and toggling the second switch at the conclusion of the preset time delay.

13. The method of claim 12, further comprising toggling the second switch while a voltage across the second switch is at a minimum voltage.

14. The method of claim 12, wherein at least one of the first switch and the second switch comprises a metal-oxide-semiconductor device.

15. The method of claim 12, wherein the preset delay represents a time for a voltage across the second switch to change from a maximum voltage to a minimum voltage.

16. The method of claim 12, wherein the first switch is arranged in parallel with the second switch.

17. The method of claim 12, further comprising charging the energy storage device to a first voltage when the first switch is closed.

18. The method of claim 12, further comprising charging the energy storage device to a second voltage when the second switch is closed.

19. The method of claim 12, further comprising opening the first and second switches concurrently, and discharging the energy storage device.

20. The method of claim 12, further comprising toggling the first switch while a voltage across the first switch is at a maximum voltage.

* * * * *

UNITED STATES PATENT AND TRADEMARK OFFICE
CERTIFICATE OF CORRECTION

PATENT NO. : 9,520,774 B2  Page 1 of 1
APPLICATION NO. : 13/230772
DATED : December 13, 2016
INVENTOR(S) : Werner Hoellinger, Stefano Marsili and Benno Ankele It is certified that error appears in the above-identified patent and that said Letters Patent is hereby corrected as shown below:

Column 10, Claim 12, Line 30-31: Replace "the first switch has a higher impedance than the first switch" with -- the first switch has a higher impedance than the second switch --

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*